July 31, 1923.

B. C. WOODFORD

TRAMPER FOR COTTON PRESSES

Filed April 7, 1921

INVENTOR.
Bronson C. Woodford
BY
Mitchell, Chadwick & Kent
ATTORNEYS.

July 31, 1923.

B. C. WOODFORD 1,463,186

TRAMPER FOR COTTON PRESSES

Filed April 7, 1921

INVENTOR.
Brinson C. Woodford
BY
Mitchell, Chadwick & Kent,
ATTORNEYS.

July 31, 1923.
B. C. WOODFORD
TRAMPER FOR COTTON PRESSES
Filed April 7, 1921
1,463,186
6 Sheets-Sheet 4
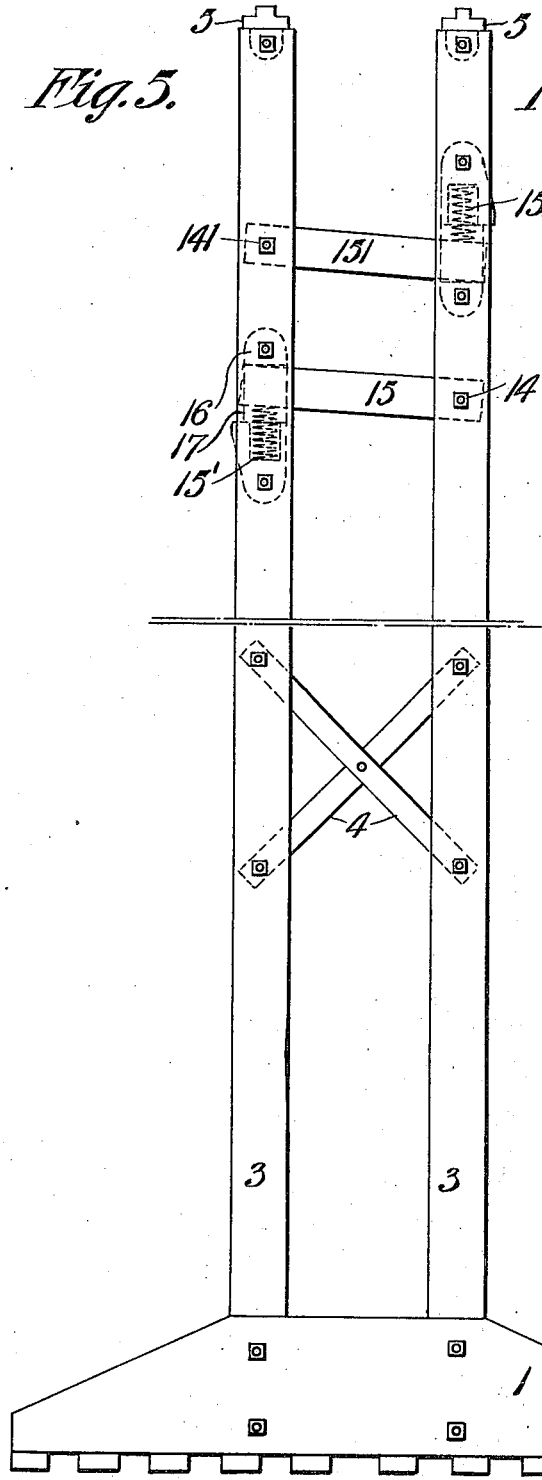
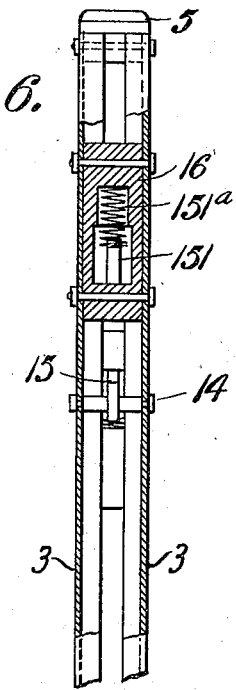
INVENTOR.
Bronson C. Woodford
BY
Mitchell, Chadwick & Kent,
ATTORNEYS.

July 31, 1923.

B. C. WOODFORD

TRAMPER FOR COTTON PRESSES

Filed April 7, 1921

INVENTOR.
Bruson C. Woodford.
BY
Mitchell, Chadwick & Kent,
ATTORNEYS.

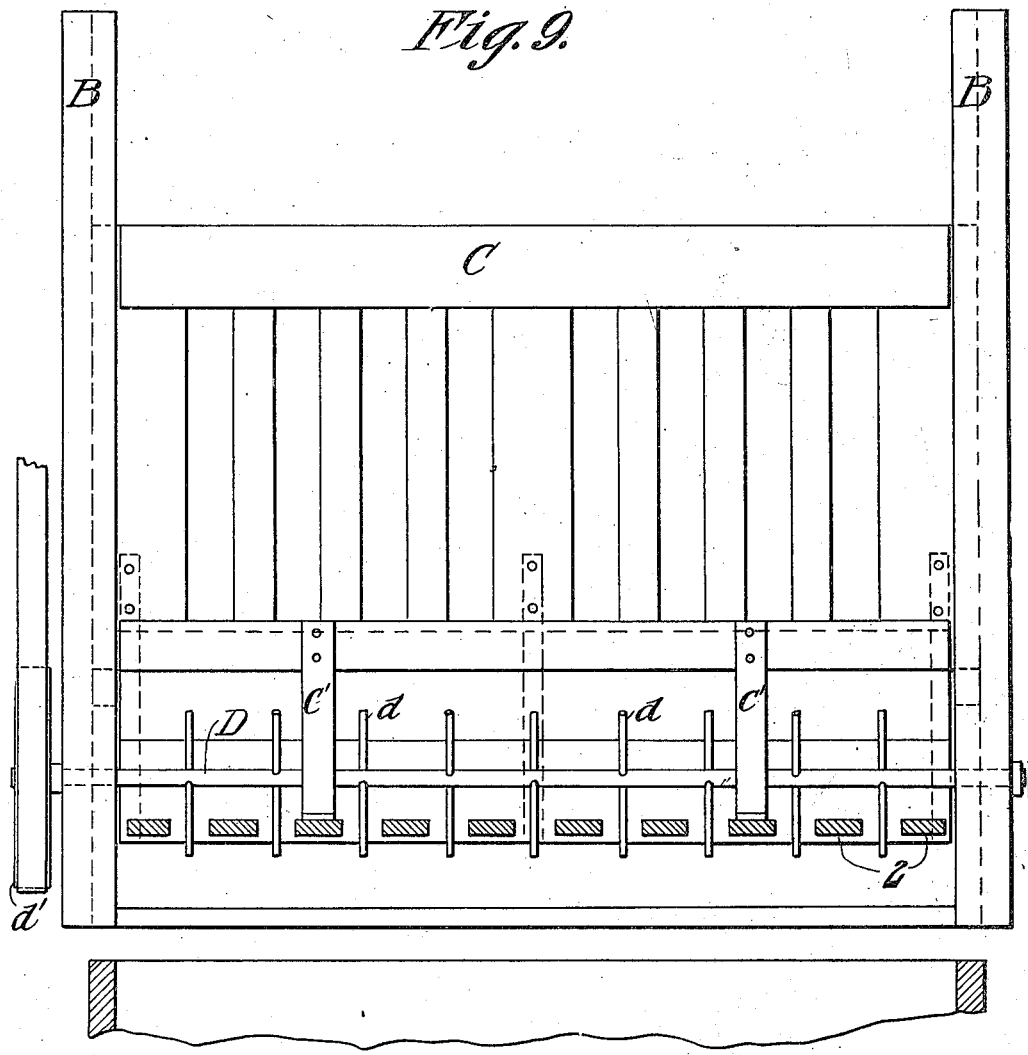

Patented July 31, 1923.

1,463,186

UNITED STATES PATENT OFFICE.

BRONSON C. WOODFORD, OF DALLAS, TEXAS, ASSIGNOR TO THE MURRAY COMPANY, OF DALLAS, TEXAS, A CORPORATION OF TEXAS.

TRAMPER FOR COTTON PRESSES.

Application filed April 7, 1921. Serial No. 459,358.

*To all whom it may concern:*

Be it known that I, BRONSON C. WOODFORD, a citizen of the United States, residing at Dallas, in the county of Dallas and State of Texas, have invented certain new and useful Improvements in Trampers for Cotton Presses, of which the following is a specification.

My invention relates to cotton baling apparatus and particularly to "trampers", so called, such as are employed in gin outfits to tramp or pack the loose lint as it is fed into the baling box of a cotton baling press in order to compact the same more or less within said box and express the air from the cotton, preparatory to its compression into a bale by the press.

Trampers for cotton presses, comprise a power operated reciprocating plunger movable into and out of the baling box, a charge of loose cotton or lint being fed into the baling box each time the plunger is withdrawn from the latter, and each charge of lint, so fed, is pushed toward the bottom of the box by the plunger when the latter is moved into the bale box again. One type of cotton press tramper heretofore provided has required the constant attention and services of an operator to manually control the movements of the plunger into and out of the baling box, which was objectionable. Other types of trampers, which are automatic in action, have either required a dwell in the cycle of the plunger movement, in order to give time for the lint-cotton to feed into the bale box by gravity, while the plunger was out of the bale box or have required mechanical lint-cotton feeding means, to hasten the feeding operation and these mechanical feeds have been objectionable on account of their complication and expense to build and maintain. The gravity feed system was simple, but not absolutely uniform in operation and somewhat slower than the mechanical feed, while the mechanical feed was complicated and expensive, requiring automatic means for starting and stopping the feed every time the plunger entered and left the press box, with frequent resulting break downs, so that the net result of speed and certainty for the mechanical feed was not better than the gravity feed.

My invention has for its object to provide a tramper for cotton presses capable of operating with maximum speed and provided with a mechanical feed of extreme simplicity, operating continuously without any necessity for any starting or stopping relative to the movements of the plunger or any connection with the plunger.

To these ends my invention consists of a tramper for cotton presses having the features of construction and mode of operation set forth in the following description and particularly pointed out and defined in the claims at the close thereof, it being understood, however, that I do not limit my invention to the specific embodiment thereof herein shown and described.

In the accompanying drawings:

Figure 5 is a front elevation of the plunger hereinafter referred to;

Figure 6 is a side view, partly broken away and in section of the upper portion of the plunger shown in Fig. 5;

Figure 9 is an elevation of the tramper feeder on a line 90° from that of Figure 7 and on line 9—9 of Figure 7.

Figure 1:
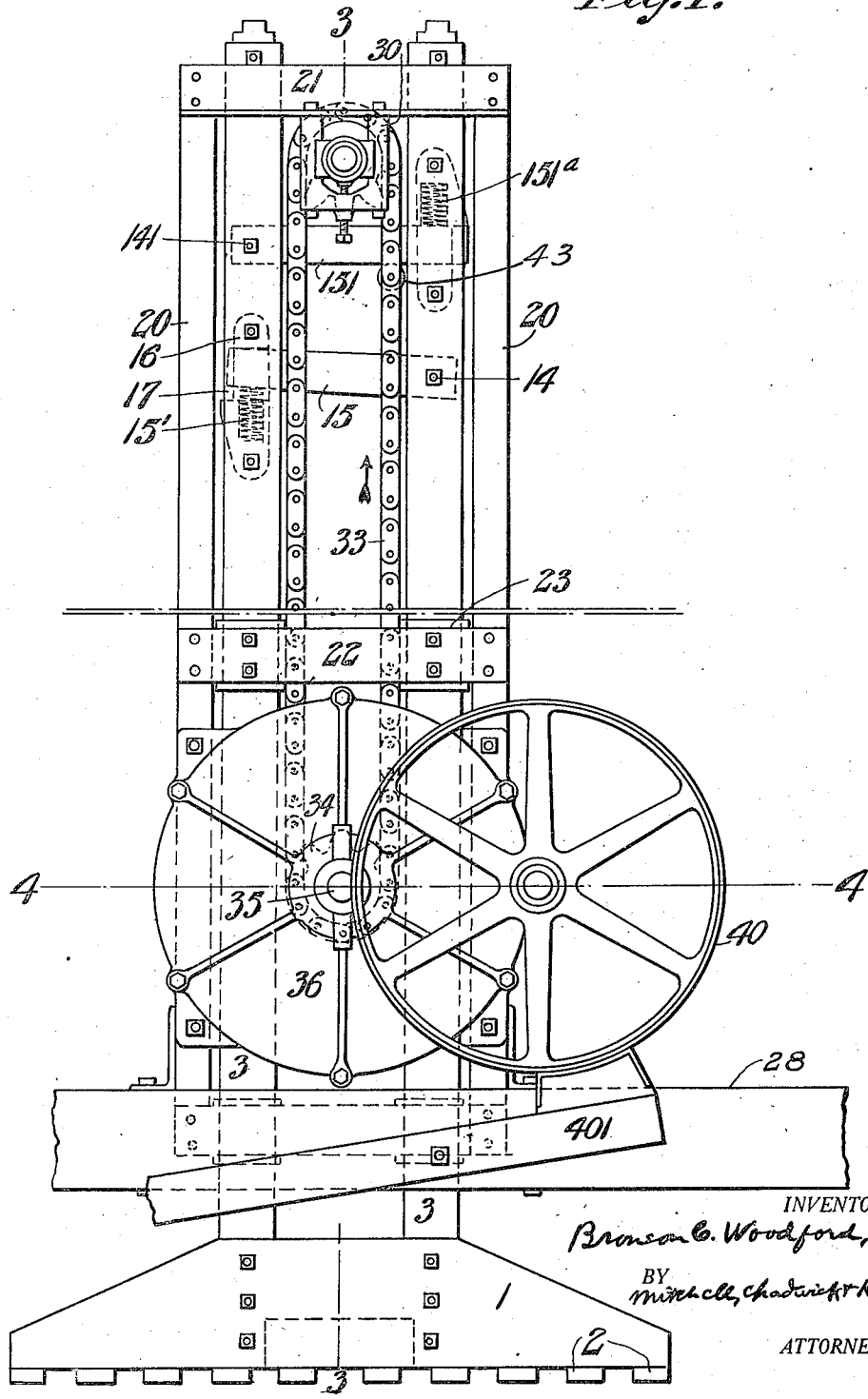
Figure 1 is a front elevation of a tramper for cotton presses constructed in accordance with my invention.
Figure 2:
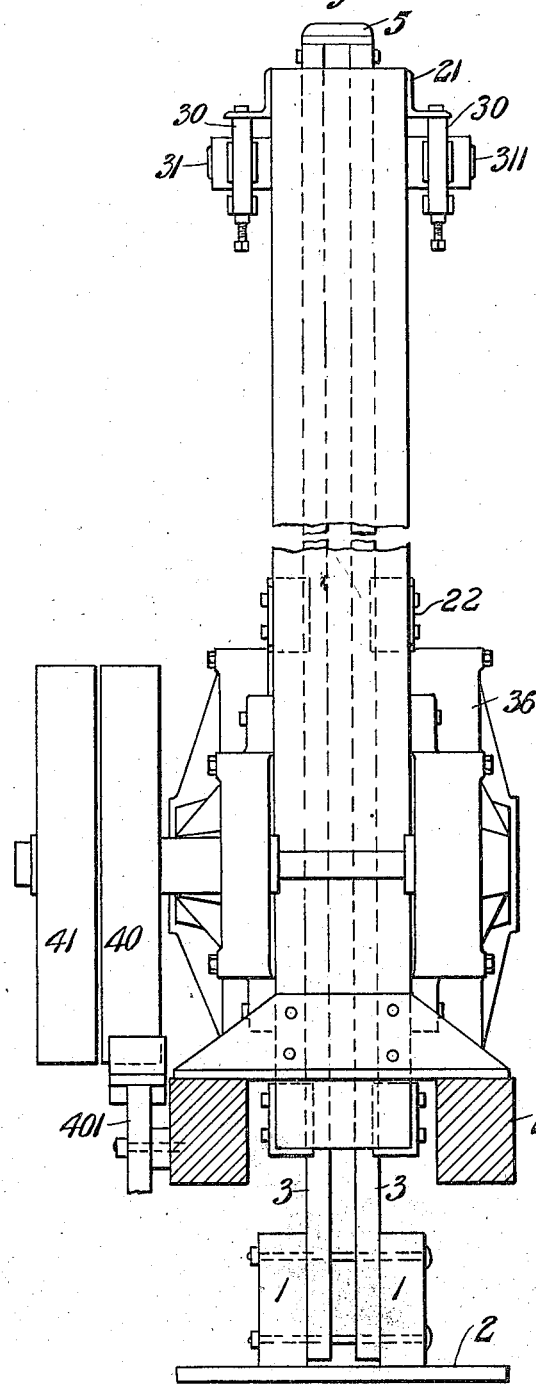
Figure 2 is a side elevation of the tramper shown in Fig. 1.

The plunger of my improved tramper (see Figs. 5 and 6), is made with a head consisting of a pair of blocks 1, 1, to the under sides of which are fastened a plurality of slats, 2, spaced apart, for a purpose hereafter to be set forth. The blocks 1, 1, of the head are bolted to the lower ends of four vertical channel iron bars, 3, which constitute the stem or shank of the plunger. The bars 3 are arranged in two pairs and are connected intermediate their ends by struts 4 which hold the two pairs of bars rigidly parallel. At their upper ends the two bars 3 of each pair are connected and held in position relatively, by a cap 5, bolted to said bars.

Mounted upon the stem of the plunger is a transversely disposed abutment bar 15, one end of which is disposed between one pair of bars 3 and is pivotally connected thereto by means of a bolt 14, while the opposite end thereof occupies a position between the other pair of bars 3 and is yieldingly supported by a shock absorbing spring 15'. The spring 15' is mounted within a pocket provided in a bracket 16 fastened by bolts to said bars 3. This bracket 16 is made with a slot 17 that is occupied by the end of abutment bar 15, the ends of said slot serving as stops to limit the swing of bar 15 in either direction.

Directly above the abutment bar 15, is a second bar 151 identical with bar 15, except that it is pivoted between the other pair of bars 3, by a bolt 141, while the opposite free end thereof occupies a position between the other pair of bars 3, over the pivoted end of abutment bar 15, and is backed up by a shock absorbing spring 151$^a$. The spring 151$^a$ is mounted within a pocket provided in a bracket 16 fastened by bolts to bars 3. This bracket is similar to the bracket 16 which cooperates with the free end of abutment bar 15.

The frame of the tramper comprises a pair of upright channel irons 20 connected together by transverse bars 21 and 22 riveted or otherwise secured at their ends to the channel irons. Bolted in position upon the inner sides of the transverse bars 22, are guide blocks 23 (see Fig. 1), within which the bars 3, constituting the stem of the plunger, are guided in their vertical reciprocation.

Near their lower ends the channel irons 20 have angle irons riveted thereto which rest upon and are bolted to a pair of sills 28 by means of which the tramper is supported in position directly over a bale box (not shown) so that when the plunger is moved vertically in the guide blocks 23 it is carried into and out of said box.

Figure 3:
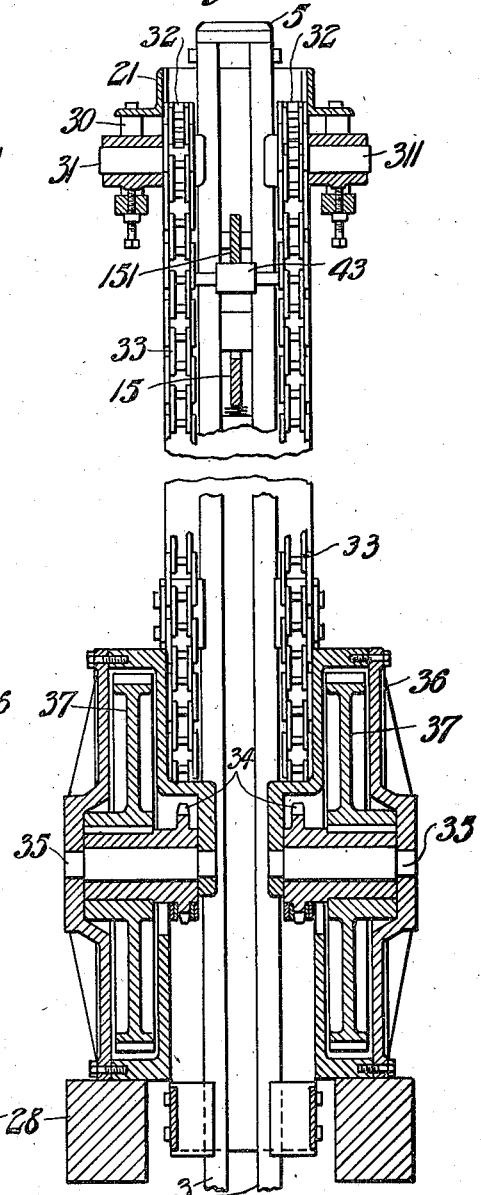
Figure 3 is a section on line 3—3 of Fig. 1.
Figure 4:
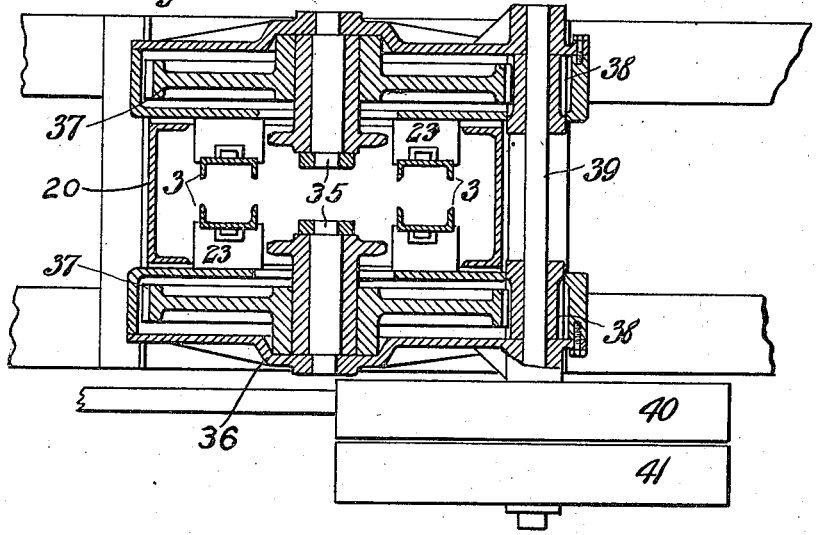
Figure 4 is a section on line 4—4 of Fig. 1.
Figure 8:
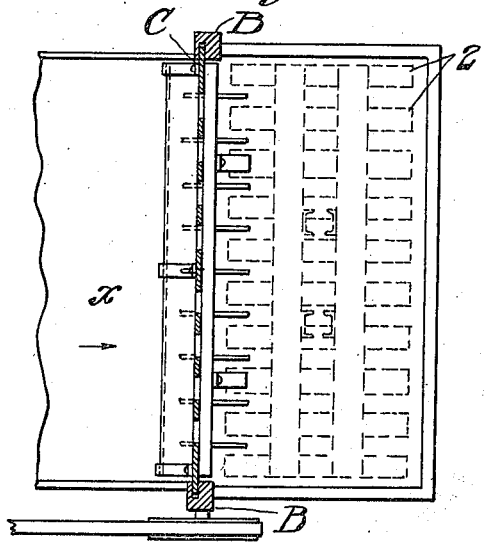
Figure 8 is a plan section on line 8—8 of Figure 7.

The transverse bars 21 which connect the upper ends of the channel irons 20 are angle irons, each having a horizontally disposed flange to the under side of which is bolted a hanger 30, said hangers respectively carrying stub shafts 31, 311, axially aligned, but separated, as shown, each shaft having mounted thereon sprocket wheels 32. Around each sprocket wheel 32 passes an endless chain 33 which extends downwardly around another sprocket wheel 34. The two lower sprocket wheels 34 are loosely mounted upon two axially aligned studs 35 mounted in housings 36 bolted to the outer sides of the upright channel irons 20, the inner ends of the studs 35 being separated, in the same manner as the inner ends of the stub shafts 31, 311 (see Fig. 3), so that space is left between the ends of shafts 31 and 311 and between the ends of studs 35, for the passage of an abutment bar which occupies a position between the two chains 33 and moves vertically with the plunger back and forth past the studs 35 and stub shafts 31, 311, when the tramper is in operation. The hub of each sprocket 34 has secured upon it (see Fig. 4) a gear 37 driven by a pinion 38, the two pinions 38 being fast on a shaft 39 that is continuously driven by a belt, not shown, engaging a pulley 40 fast on said shaft. Alongside of the fixed pulley 40 is provided a loose pulley 41 onto which the belt can be shifted when it is desired to stop the machine.

When the belt is so shifted onto the loose pulley it is done while the plunger is in elevated position, so that the bale box may be shifted and another bale box substituted. To hold the plunger in elevated position while the machine is stopped, a brake 401 is provided, which may be brought into frictional engagement with pulley 40.

The two chains 33 carry, mounted between them an actuating roller 43 and when the machine is operating this actuating roller is revolving continuously in an endless path between the endless paths of the chains in the direction indicated by the arrow in Figure 1.

During the upward movement thereof roller 43 engages the under side of abutment bar 151, and through the latter acts to lift the plunger, the roller carrying the abutment bar 151 and plunger upwardly until the roller passes around the upper sprockets 32, when the roller travels down the other side of the path and contacts with the upper side of abutment bar 15, carrying the plunger down into the bale box, until roller 43 passes under the lower sprocket wheels 34. In passing around the lower sprocket wheels 34 the roller 43 leaves the bar 15 and again picks up the bar 151, thus completing the cycle.

I have described above the construction and operation of the preferred form of my plunger operating mechanism, which, as will now be clear, reciprocates continuously, with only the slightest pause at each end of the stroke while the chain and roller pass around the sprockets at each end, and may be speeded up, very simply, to any practicable extent.

Figure 7:
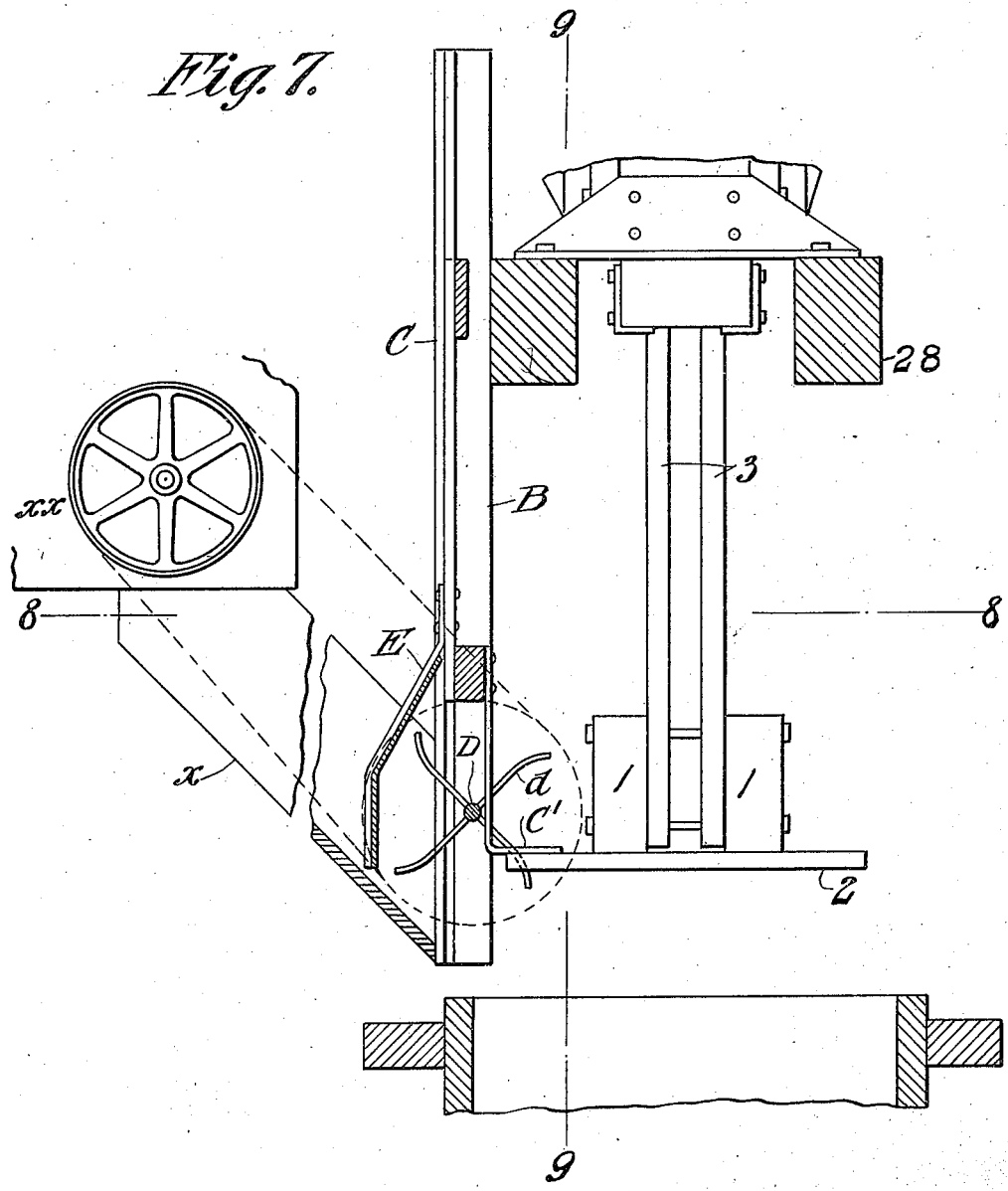
Figure 7 is a sectional elevation of the tramper showing the feed mechanism.

I will now describe my improved feeding mechanism. It will be obvious that the cotton which is to be tamped or "tramped" into the bale box must be fed into the bale box during the time that the plunger is lifted out of the box and before it descends again into the box. When the plunger is working fast, the time interval is but short, the complete stroke being made in 12 to 15 seconds about half of which time the plunger head is below the delivery end of the feed chute. In machines fed by gravity, that is, in which the cotton slides through some guide way and is directed into the bale box, the final delivery must obviously be made by a chute or guide the end of which, at the bale box, must be provided with a gate to interrupt the flow of cotton when the plunger head is in the bale box and to open when the plunger head is withdrawn from the bale box to permit cotton to be delivered into the bale box. There is a tendency of the cotton as it leaves the chute to fall upon the near side of the bale box and it has been sought to overcome this tendency by providing mechanical means, such as reciprocating push rods or a rotating member carrying a multiplicity of projections, set within and at the exit end of the cotton chute close behind the gate or closure. When the gate was automatically lifted to permit the exit of cotton the rotating member was simultaneously set in rotation and the cotton pitched by the arms, into and across the bale box and when the gate was lowered to shut off the cotton, the shaft was stopped. The continual start and stop action of the feed apparatus was disadvantageous in many ways and resulted in wear and breakage and frequent repairs and adjustments. In my improved feed mechanism I provide a chute X for the lint-cotton, leading directly from the condenser XX to a position close to the upper end of the bale box. At the delivery end of the chute are erected two upright members B to form a guide and slide between which a carrier, C, is mounted to slide vertically up and down. Below the carrier C, between the members B, is mounted a feed member, preferably a shaft D provided with a multiplicity of preferably curved arms $d$. Fast to the carrier C is an offset shield or gate E, projecting into the chute, when lowered, between the condenser and the shaft D. The gate-carrier C also carries a pair of dogs C' which depend to a point about on a level with the lower side of the gate E, but on the press box side of the shaft D, the dogs passing close to the shaft, between adjacent rows of arms $d$. The arms $d$, in rotation, pass into the path of the plunger head (see Fig. 7) but, due to the spaces or slots formed between the slats 2, they move without interference with the plunger head. It will be apparent therefore, that the formation of the pressing end of the plunger head, of slats, 2, spaced apart, serves a double purpose, in permitting the easy escape of air expressed from the cotton and also providing a slotted head, in the slots between adjacent slats of which, the arms $d$ of the rotating feed member, may pass without interference (see Figs. 7 and 9). One end of the shaft D carries a pulley $d'$ which is connected by a belt to a pulley on a doffer roll of the condenser or to any other convenient source of continuous power. It will now be obvious that, when the tramper is in action, as the plunger head is lifted it will pick up the dogs C' and as it rises will elevate the carrier C carrying up the gate or shield E thus permitting the cotton-lint to slide down the chute, X where it is engaged by the arms $d$ which travel in the path of the cotton, and pitched into and across the bale box beneath the plunger. As the plunger head descends the carrier C and its associated parts are also lowered until before the plunger head has passed the delivery end of the chute, the shield E has cut off the access of cotton to the arms $d$ which continue to revolve idly until the lifting of the plunger head lifts gate E and permits a further flow of cotton lint down the chute X to the feed mechanism. The projecting of the feed member beyond the limits of the chute into the path of the plunger head and directly over the bale box is a novel feature and of distinct advantage and the cut-off of the cotton-lint before it reaches the feeder is also a novel feature and makes it possible to rotate the feeder continuously, thus obviating the necessity of mechanism to start and stop the feed mechanism at frequent intervals as has heretofore been practiced.

I claim:—

1. In a cotton press, a frame made up of opposite sides; sprocket wheels separately mounted at each end of each side opposite and in axial alignment with the other separately mounted sprocket wheel; endless sprocket chains connecting the sprockets on each side; a plunger head having a stem between the two sides; a pair of actuation bars secured cross-wise of the stem and extending between the chains; an actuating member connecting the chains and extending between the cross bars; means to rotate the sprockets; all combined to cause the plunger head to be reciprocated by the continuous revolution of the sprocket chains.

2. In a cotton press, a frame made up of vertical opposite sides; sprocket wheels separately mounted at each end of each side opposite and in axial alignment with the other separately mounted sprocket wheel; endless sprocket chains connecting the sprockets on each side; a plunger head having upstanding standards extending upward between the frame sides; a pair of actuation bars, connecting the plunger standards and passing between the chains; a roller bearing connecting the chains and passing between the actuation bars; means to rotate the sprockets; all combined to cause the plunger head to be reciprocated by the continuous revolution of the sprocket chains.

3. In a cotton press, a press box and a reciprocating plunger, having a slotted head, to receive the feeder fingers; a chute for guiding the cotton lint to the upper end of the box; a revolving feed member provided with outstanding fingers which move in the path of the cotton and the slotted plunger head; means to rotate the feed member continuously; a movable gate set above the feed chute between the feed member and the cotton supply; means to actuate the gate, synchronized with the plunger, to cut-off the cotton supply to the feeder while the plunger is below the feed shaft.

4. In a cotton press, a press box and a reciprocating plunger, having a slotted head, to receive the feeder fingers; means to actuate the plunger; a chute for guiding the cotton lint to the upper end of the box; a pair of vertical standards at the exit end of the feed chute on opposite sides; a revolving shaft mounted between the standards and provided with outstanding fingers which move in the path of the cotton and the slotted plunger head; means to rotate the feed shaft continuously; a carrier between the standards and over the feed shaft, vertically slidable; a gate secured to the carrier and offset to project above and into the chute, between the feed shaft and the cotton supply; a dog depending from the carrier between the feed shaft and the plunger, and above and in the path of the plunger, all combined to cause the plunger to open and close the cotton cut-off gate, as the plunger rises and falls.

Signed at Dallas, Texas, this 28th day of March, 1921.

BRONSON C. WOODFORD.